(12) United States Patent
Knauf et al.

(10) Patent No.: US 11,396,170 B2
(45) Date of Patent: Jul. 26, 2022

(54) COMPOSTABLE LAMINATE STRUCTURE

(71) Applicant: GPCP IP Holdings LLC, Atlanta, GA (US)

(72) Inventors: Gary Harold Knauf, Bear Creek, WI (US); Joseph Pounder, Greenville, WI (US)

(73) Assignee: GPCP IP Holdings LLC, Atlanta, GA (US)

( * ) Notice: Subject to any disclaimer, the term of this patent is extended or adjusted under 35 U.S.C. 154(b) by 27 days.

(21) Appl. No.: 16/920,255

(22) Filed: Jul. 2, 2020

(65) Prior Publication Data
US 2021/0245485 A1 Aug. 12, 2021

Related U.S. Application Data

(60) Provisional application No. 62/975,560, filed on Feb. 12, 2020.

(51) Int. Cl.
*B32B 7/14* (2006.01)
*B32B 29/00* (2006.01)
(Continued)

(52) U.S. Cl.
CPC ............ *B32B 29/005* (2013.01); *B32B 3/00* (2013.01); *B32B 7/14* (2013.01); *B65D 65/40* (2013.01); *B32B 2255/12* (2013.01); *B32B 2255/28* (2013.01); *B32B 2264/10* (2013.01); *B32B 2307/7265* (2013.01); *B32B 2439/70* (2013.01); *Y10T 428/24802* (2015.01)

(58) Field of Classification Search
CPC ............ B32B 29/005; B32B 2255/12; B32B 2255/28; B32B 2264/10; B32B 2307/7265; B32B 2439/70
See application file for complete search history.

(56) References Cited

U.S. PATENT DOCUMENTS 5,128,182 A 7/1992 Bunker et al.
5,456,968 A 10/1995 Jones
(Continued)

FOREIGN PATENT DOCUMENTS

EP 1361044 A2 11/2003
EP 2583910 A1 4/2013
(Continued)

OTHER PUBLICATIONS

"Compostable Plastics 101: An Overview of Compostable Plastics", Sponsored by the California Organics Recycling Council, Apr. 5, 2011, 23 pages.
(Continued)

*Primary Examiner* — Elizabeth E Mulvaney

(57) ABSTRACT

A compostable laminate for food wrap and method for making same. The wrap can include a first layer of paper material, a second layer of paper material, and a series of coatings between the paper materials. The coatings include a first flood coating having water and/or barrier properties, a second flood coating having water and/or oil barrier properties, and a third coating that only partially covers the second flood coating. None of the first, second and third coatings comprise a thermoplastic or polyolefin, and are made substantially from one or more biodegradable and/or compostable materials.

25 Claims, 3 Drawing Sheets

(51) Int. Cl.
*B65D 65/40* (2006.01)
*B32B 3/00* (2006.01)

(56) References Cited

U.S. PATENT DOCUMENTS

| | | | |
|---|---|---|---|
| 6,007,666 A * | 12/1999 | Bunch | B32B 29/00 |
| | | | 156/280 |
| 9,797,096 B2 | 10/2017 | Olkkonen et al. | |
| 2004/0024102 A1 | 2/2004 | Hayes et al. | |
| 2019/0218429 A1* | 7/2019 | Huang | B32B 27/32 |
| 2020/0031556 A1 | 1/2020 | Jobe | |
| 2020/0095731 A1 | 3/2020 | Spender et al. | |
| 2020/0215802 A1* | 7/2020 | Gonzalez | B32B 7/12 |
| 2020/0231325 A1 | 7/2020 | Tibbets | |
| 2020/0282708 A1 | 9/2020 | Leuer | |
| 2020/0290321 A1* | 9/2020 | Buschmann | B32B 27/304 |
| 2021/0002520 A1* | 1/2021 | Huang | C09J 11/00 |
| 2021/0246614 A1* | 8/2021 | Mattingly | D21H 19/18 |

FOREIGN PATENT DOCUMENTS

| | | | |
|---|---|---|---|
| GB | 2539493 A | 12/2016 | |
| WO | 9853141 A1 | 11/1998 | |

OTHER PUBLICATIONS

International Search Report and Written Opinion received for PCT Application No. PCT/IB2021/050913, dated May 17, 2021, 9 pages.

\* cited by examiner

COMPOSTABLE LAMINATE STRUCTURE

BACKGROUND

Description of the Related Art

Wrap materials have long been used to package food, whether hot or cold, and especially food from "fast food" type establishments. In addition to keeping the foodstuff relatively fresh for a period of time, food wraps provide heat retention before the food can be consumed and can protect the food in an eye appealing manner. Conventional wrap materials are typically made from relatively thin sheets of paper that are coated, cut into sheets and packaged into boxes.

The coating is typically done by applying heated wax or polyethylene in an off-line coating station onto a running paper web. The hot coating is in a molten form and thus adheres uniformly to the base paper and forms a resistant layer. The coating layer is relatively thin and light in comparison to the base paper being coated and thus in part cools down by itself to solid state as heat transfers from the coating to the base paper. When the coating is in the solid state, the coated paper is ready to be rolled or cut into sheets and boxed.

Conventional wrap materials include polyethylene coated paper, hot melt coated paper, foil/tissue laminations, dry wax, etc. These wrap materials typically rely on high moisture retention to maximize heat retention. Consequently, the wrapped, heated foodstuff becomes soggy and unpalatable. Additionally, unsightly grease produced during heating of the foodstuff can remain in the wrapped package, causing additional sogginess as well as unsightly grease stains. Even where moisture vapor is permitted to escape, for example, through semi-permeable thermoplastic films, unsightly grease can still appear on the thermoplastic film layer and can even be reabsorbed by the food from which it originated. Other conventional wrap materials have used three layers, which are typically a semi-permeable thermoplastic film between two paper layers. The second paper layer is used on the outer surface of the wrap, and is usually printed with a logo, name, description, etc. The second paper layer typically will not contact the food, unless folded over, and typically does not provide absorbency to help address the sogginess and grease stains issues.

There is still a need, therefore, for an improved food wrap capable of overcoming the foregoing deficiencies, and a method for manufacturing such a wrap material.

SUMMARY

A compostable food wrap and method for making same are provided. The compostable food wrap can include a first layer of paper material, a second layer of paper material, and a series of coatings between the paper materials. The coatings include a first flood coating having water barrier properties, a second flood coating having oil barrier properties and water barrier properties, and a third coating that only partially covers the underlying flood coating. None of the first, second and third coatings comprise a thermoplastic or polyolefin, and are substantially made from one or more compostable materials.

BRIEF DESCRIPTION OF THE DRAWINGS

So that the manner in which the above recited features of the present invention can be understood in detail, a more particular description of the invention, briefly summarized above, can be had by reference to embodiments, some of which are illustrated in the appended drawings. The drawings are not necessarily to scale and certain features and certain views of the drawings can be shown exaggerated in scale or in schematic for clarity and/or conciseness. It is to be noted, however, that the appended drawings illustrate only typical embodiments of this invention and are therefore not to be considered limiting of its scope, for the invention can admit to other equally effective embodiments as defined in the claims.

DETAILED DESCRIPTION

Figure 1:
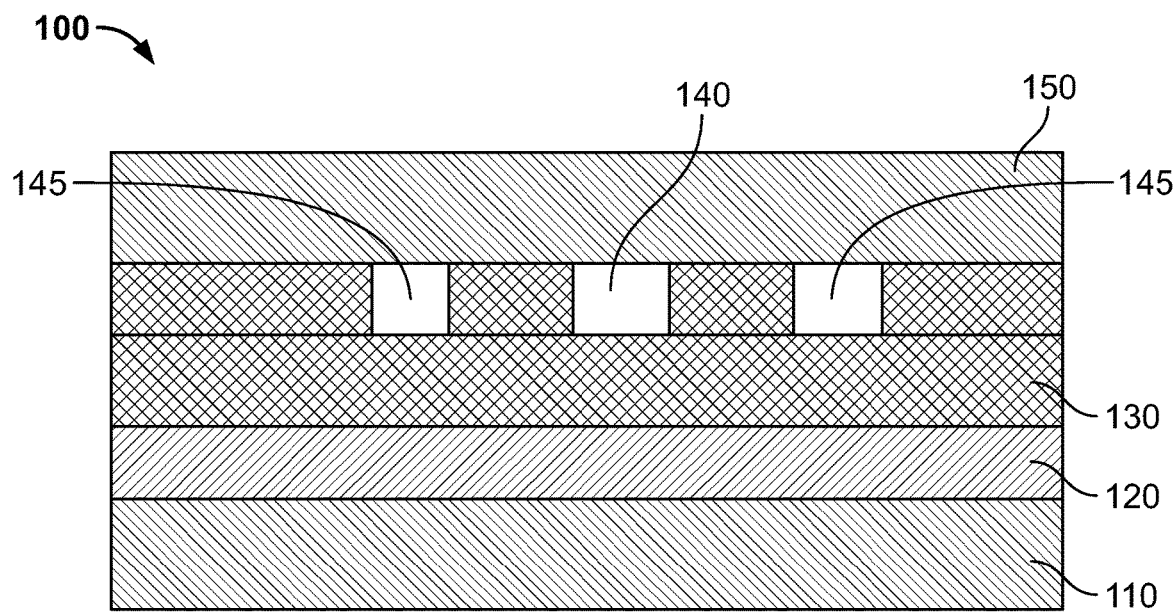
FIG. 1 depicts an illustrative side perspective view of one embodiment of a biodegradable and/or compostable insulated food wrap, according to one or more embodiments provided herein.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention.

The present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the formation of a first layer over or on a second layer in the description that follows can include embodiments in which the first and second layers are formed in direct contact, and can also include embodiments in which additional layers can be formed by interposing the first and second layers, such that the first and second layer are not in direct contact. Finally, the exemplary embodiments presented below can be combined in any combination of ways, i.e., any element from one exemplary embodiment can be used in any other exemplary embodiment, without departing from the scope of the disclosure.

Certain terms are used throughout the following description and claims to refer to particular components. As one skilled in the art will appreciate, various entities can refer to the same component by different names, and as such, the naming convention for the elements described herein is not intended to limit the scope of the invention, unless otherwise specifically defined herein. Further, the naming convention used herein is not intended to distinguish between components that differ in name but not function.

In the following discussion and in the claims, the terms "including" and "comprising" are used in an open-ended fashion, and thus should be interpreted to mean "including, but not limited to." The phrase "consisting essentially of" means that the described/claimed layer or coating does not include any other components that will materially alter its properties by any more than 5% of that property, and in any case does not include any other component to a level greater than 3 mass %. The term "or" is intended to encompass both exclusive and inclusive cases, i.e., "A or B" is intended to be synonymous with "at least one of A and B," unless otherwise expressly specified herein. The indefinite articles "a" and "an" refer to both singular forms (i.e., "one") and plural referents (i.e., one or more) unless the context clearly dictates otherwise. For example, embodiments using "an additive" include embodiments where one, two, or more additives are used, unless specified to the contrary or the context clearly indicates that only one additive is used.

All numerical values in this disclosure can be exact or approximate values unless otherwise specifically stated. Accordingly, various embodiments of the disclosure can deviate from the numbers, values, and ranges disclosed herein without departing from the intended scope.

A detailed description will now be provided. Each of the appended claims defines a separate invention, which for infringement purposes is recognized as including equivalents to the various elements or limitations specified in the claims. Depending on the context, all references to the "invention" may in some cases refer to certain specific embodiments only. In other cases, it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this disclosure is combined with publicly available information and technology.

According to one or more embodiments of the present invention, the food wrap is biodegradable and/or compostable and is constructed of 3 or more layers of biodegradable and/or compostable materials, preferably 4 or more layers and more preferably 5 or more layers. For example, the food wrap can include at least a first base sheet or substrate 110, at least a first coating or water-resistant layer 120, at least a second coating or oil resistant layer 130, at least a third coating or adhesive layer 140, and at least a second base sheet or substrate 150. The food wrap is also insulated between by creating a plurality of air gaps or pockets between any one or more layers of the wrap.

FIG. 1 depicts an illustrative side perspective view of one embodiment of a biodegradable and/or compostable insulated wrap 100, according to one or more embodiments provided herein. A first coating or layer 120 can be deposited or otherwise disposed on the first substrate 110. The first coating 120 can entirely cover or at least substantially cover the first substrate 110. A second coating or layer 130 can entirely cover or at least substantially cover the first layer 120. A third coating or layer 140 will only partially cover the second layer 130 to provide a patterned deposition intended to create voids or air pockets 145 after the second base sheet or substrate 150 is laid on and over the patterned layer 140 and in direct contract with this patterned layer 140. These voids or air pockets 145 can trap air and can provide excellent heat retention for the food within the wrap 100. As explained in more detail below with referenced to FIGS. 2 and 4, the voids or air pockets 145 can define open cells or closed cells.

In certain embodiments, the order of the first layer 120 and the second layer 130 can be reversed. Said another way, the second coating or layer 130 can be disposed on the first base sheet 110, the first coating or layer 120 can be disposed on the second coating or layer 130, the patterned layer 140 can be disposed on the first coating 120, and the second base sheet on the patterned layer 140.

The base sheets or substrates 110, 150 can be the same or can be different. Each base sheet or substrate 110, 150 can be made from paper or paperboard. The paper or paperboard can be bleached or unbleached Kraft paper. The paper or paperboard also can be formed from a blend of natural Kraft unbleached fibers and bleached fibers. Either base sheet 110, 150 can be printed, or both base sheets 110, 150 can be printed, or neither base sheet 110, 150 is printed.

Each base sheet or substrate 110, 150 can be uncoated or coated. One or both of the outer surfaces of the base sheet 110, 150 can also be surface treated to increase the surface energy to render the base sheet surface more receptive to metallization, coatings, printing inks, and/or lamination. The surface treatment can be carried out according to one of the methods known in the art including corona discharge, flame, plasma, chemical treatment, or treatment by means of a polarized flame.

Each base sheet or substrate 110, 150 can be coated with one or more sizing agents, waxes and/or clays. Suitable sizing agents can be or can include alkenyl ketene dimer (ALKD), alkyl ketene dimer (AKD), and alkenyl succinic anhydride (ASA)), fluorochemicals, silicones, hydrophobically modified anionic polymer (HMAP), hydrophobically modified cationic polymer (HMCP), ethylene-acrylic acid (EAA), neutral rosin emulsions, and combinations thereof. In certain embodiments, a coated base sheet or substrate 110, 150 specifically excludes fluorochemicals. Suitable size-press coatings can have starch, polyvinyl alcohol, polymer latex polymers, clay and other inorganics present. For example, the size-press coating can be primarily inorganic particles (calcium carbonate or clay) and a small amount of polymer binder to hold the particles together. Such coating layer(s) can have a thickness ranging from a low of about 0.002 mm, about 0.005 mm, about 0.01 mm, about 0.03 mm, about 0.05 mm, about 0.07 mm, or about 0.1 mm to a high of about 0.15 mm, about 0.17 mm, about 0.2 mm, about 0.25 mm, about 0.3 mm, or about 0.35 mm.

Each base sheet or substrate 110, 150 can include one or more additives to improve processability or handling. Suitable additives can include, but are not limited to opacifying agents, pigments, colorants, fillers, softeners, preservatives, anti-fungal agents, spacers, crosslinks, surfactants, defoamers, rheology modifiers, slip agents, antioxidants, anti-static agents, moisture barrier additives, gas barrier additives and combinations thereof. Examples of suitable opacifying agents, pigments or colorants are iron oxide, carbon black, aluminum, titanium dioxide ($TiO_2$), calcium carbonate ($CaCO_3$), polybutylene terephthalate (PBT), talc, beta nucleating agents, and combinations thereof.

Slip agents can include higher aliphatic acid amides, higher aliphatic acid esters, waxes, silicone oils, and metal soaps. Such slip agents can be used in amounts ranging from about 0.1 wt % to about 2 wt % based on the total weight of the layer to which it can be added.

Suitable antioxidants can include phenolic antioxidants. Antioxidants can be generally used in amounts ranging from about 0.1 wt % to 2 wt %, based on the total weight of the layer(s) to which it can be added.

Anti-static agents can include alkali metal sulfonates, polyether-modified polydiorganosiloxanes, polyalkylphenylsiloxanes, and tertiary amines. Such anti-static agents can be used in amounts ranging from about 0.05 wt % to about 3 wt %, based upon the total weight of the layer(s).

Suitable fillers can include finely divided inorganic solid materials such as silica, fumed silica, diatomaceous earth, calcium carbonate, calcium silicate, aluminum silicate, kaolin, talc, bentonite, clay, and pulp.

Suitable moisture and gas barrier additives can include effective amounts of low-molecular weight resins, hydrocarbon resins, particularly petroleum resins, styrene resins, cyclopentadiene resins, and terpene resins.

Such additives can be used in effective amounts, which can vary depending upon the property required. To prevent blocking, for example, either or both base sheets 110, 150 can include one or more anti-block particles or slip additives. A metal, such as aluminum, can be disposed on one or both sides of the base sheets 110, 150 to provide additional barrier properties.

The thickness of each base sheet 110, 150 can be the same or different. The thickness can vary between about 0.75 mils and about 2.5 mils. For example, the thickness of each base sheet 110, 150 can range from a low of about 0.75 mil to a high of about 2.5 mils. For example, the thickness of each base sheet 110, 150 can range from a low of about 0.7 mils, 0.8 mils or 1.0 mils to a high of about 1.7 mils, 2.0 mils, or about 2.5 mils. The thickness of each base sheet 110, 150 can also be about 1.0 mils, about 1.25 mils, about 1.50 mils, about 1.75 mils, or about 2.0 mils.

The basis weight of each base sheet 110, 150 can be the same or different. The basis weight of each base sheet 110, 150, for example, can range from about 7 lbs/ream to about 25 lbs/ream. For example, the basis weight of each base sheet 110, 150 can range from a low of about 8, about 9, or about 10 lbs/ream to a high of about 12, about 15, or about 20 lbs/ream. The basis weight of each base sheet 110, 150 can also be about 7 lbs/ream to about 20 lbs/ream, or about 8 lbs/ream to about 18 lbs/ream, or about 9 lbs/ream to about 15 lbs/ream. In certain embodiment, the basis weight of each base sheet 110, 150 can be about 11.0 lbs/ream, about 11.5 lbs/ream, about 12.0 lbs/ream, about 12.5 lbs/ream, about 13.0 lbs/ream, or about 13.5 lbs/ream. As used herein, the term "ream" refers to 3,000 $ft^2$ of material.

First Layer/First Flood Coating 120

The first coating or layer 120 can be disposed on or over the first base sheet 110. The first coating layer b 120 can entirely or at least substantially cover the first substrate 110. The first coating layer 120 can be water resistant, oil resistant, or both. The first coating layer 120 can be or can include any one or more compostable materials suitable for inhibiting oil, liquid water migration, water vapor migration, water vapor transmission, or any two or more of the foregoing. The first coating layer 120 can be or can include one or more compostable water-based polymers. The first coating layer 120 can also be or can include one or more emulsion waxes.

The dry basis weight of the first coating layer 120 can range from about 0.025 lbs/ream to about 5 lbs/ream. For example, the dry basis weight of the first coating layer 120 can range from a low of about 0.025, about 0.030, or about 0.050 lbs/ream to a high of about 0.75, about 1.25, or about 1.5 lbs/ream. The dry basis weight of the first coating layer 120 can also be about 0.020 lbs/ream to about 1.5 lbs/ream, or about 0.030 lbs/ream to about 1.5 lbs/ream, or about 0.050 lbs/ream to about 1.5 lbs/ream. The dry basis weight of the first coating layer 120 can also be about 0.050 lbs/ream, or about 0.075 lbs/ream, or about 0.100 lbs/ream, or about 0.500 lbs/ream, or about 0.750 lbs/ream, or about 1.00 lbs/ream, or about 1.25 lbs/ream, or about 1.50 lbs/ream.

Second Layer/Second Flood Coating 130

The second coating or layer 130 can be disposed on or over the first coating 120. In certain embodiments, the second coating 130 can entirely or at least substantially cover the first coating 120. The second coating 130 can be water resistant, oil resistant, or both. The second coating 130 can be or can include any one or more compostable materials suitable for inhibiting oil, liquid water migration, water vapor migration, water vapor transmission, or any two or more of the foregoing.

The second coating or layer 130 can be a tie layer having adhesive characteristics. The second coating 130 can also be formed from one or more bio-degradable and/or one or more compostable materials. The second coating 130 can be formed from the same or similar materials as the first coating layer 120. The second coating 130 can be formed from materials not found in the first coating layer 120.

The second coating 130 can be formed from one or more bio-degradable and/or one or more compostable materials that promote adhesion between the internal layers of the wrap and increase resistance to oil and/or water permeation. The second coating 130 can also be formed from one or more bio-degradable and/or one or more compostable materials that increase resistance to oil permeation, and that absorb water. The second coating layer 130 can be or can include one or more bio-degradable and/or one or more compostable water-based polymers or resins. The second coating layer 130 can be or can include one or more bio-degradable and/or one or more compostable emulsion waxes.

The dry basis weight of the second coating layer 130 can range from about 0.020 lbs/ream to about 5 lbs/ream. For example, the dry basis weight of the second coating layer 130 can range for a low of about 0.020, about 0.025, or about 0.035 lbs/ream to a high of about 0.075, about 1.0, or about 2.0 lbs/ream. The dry basis weight of the second coating layer 130 can also be about 0.020 lbs/ream to about 2.0 lbs/ream, or about 0.030 lbs/ream to about 1.8 lbs/ream, or about 0.05 lbs/ream to about 1.5 lbs/ream. The dry basis weight of the second coating layer 130 can also be about 0.025 lbs/ream, or about 0.030 lbs/ream, or about 0.050 lbs/ream, or about 0.075 lbs/ream, or about 0.10 lbs/ream, or about 0.50 lbs/ream, or about 0.75 lbs/ream, or about 1.00 lbs/ream, or about 1.25 lbs/ream, or about 1.50 lbs/ream.

Third Layer/Pattern Adhesive 140

The third coating or adhesive layer 140 can be at least partially disposed on the second resistant layer 130 to provide a patterned deposition intended to create the voids or air pockets 145 once the second base sheet or substrate 150 is laid on and over this patterned layer 140. The patterned layer 140 also creates a puckered-like appearance and feel to the resulting wrap 100. The air pockets 145 also provide heat increase insulation within the wrap 100, as explained in more detail below.

The patterned layer 140 can have any suitable shape or size and can be a patterned layer in either the machine direction, the transverse direction, or both directions of the wrap. The third coating layer 140 can also be continuous in the machine direction or continuous in the transverse direction, but not in both directions. Preferably, the patterned layer 140 can include two or more lines that are continuous in the transverse direction and spaced apart from each other in the machine direction. The two or more lines can touch or be completely independent from one another.

Figure 2:
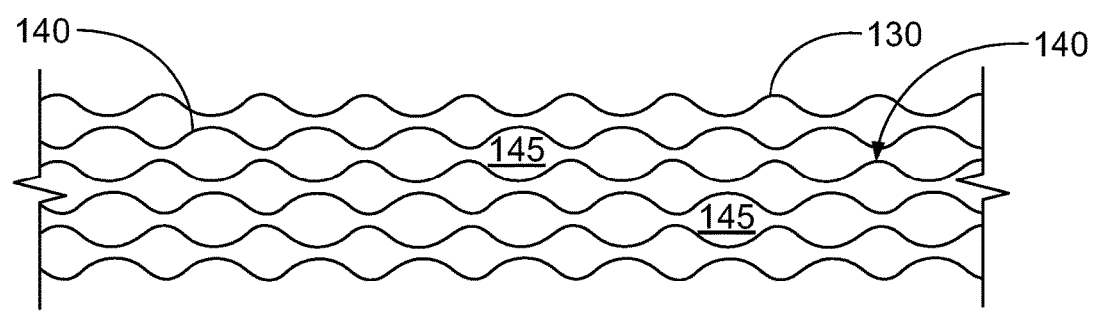
FIG. 2 depicts an illustrative plan view of the top surface after the deposition of the patterned adhesive layer 140, according to one or more embodiments provided herein.

One illustrative arrangement of the patterned layer 140 is depicted in FIG. 2, which depicts an illustrative plan view of the top surface after the deposition of the patterned adhesive layer 140, according to one or more embodiments. As shown, the patterned layer 140 can be deposited as two or more discreet lines of material. The lines can be wavy, curved, sinusoidal, straight, generally straight, or any other configuration. The lines can be deposited or otherwise arranged such that they do not touch at all, allowing any trapped air between the layers within the air pockets 145 to escape from the sides of the roll.

Figure 3:
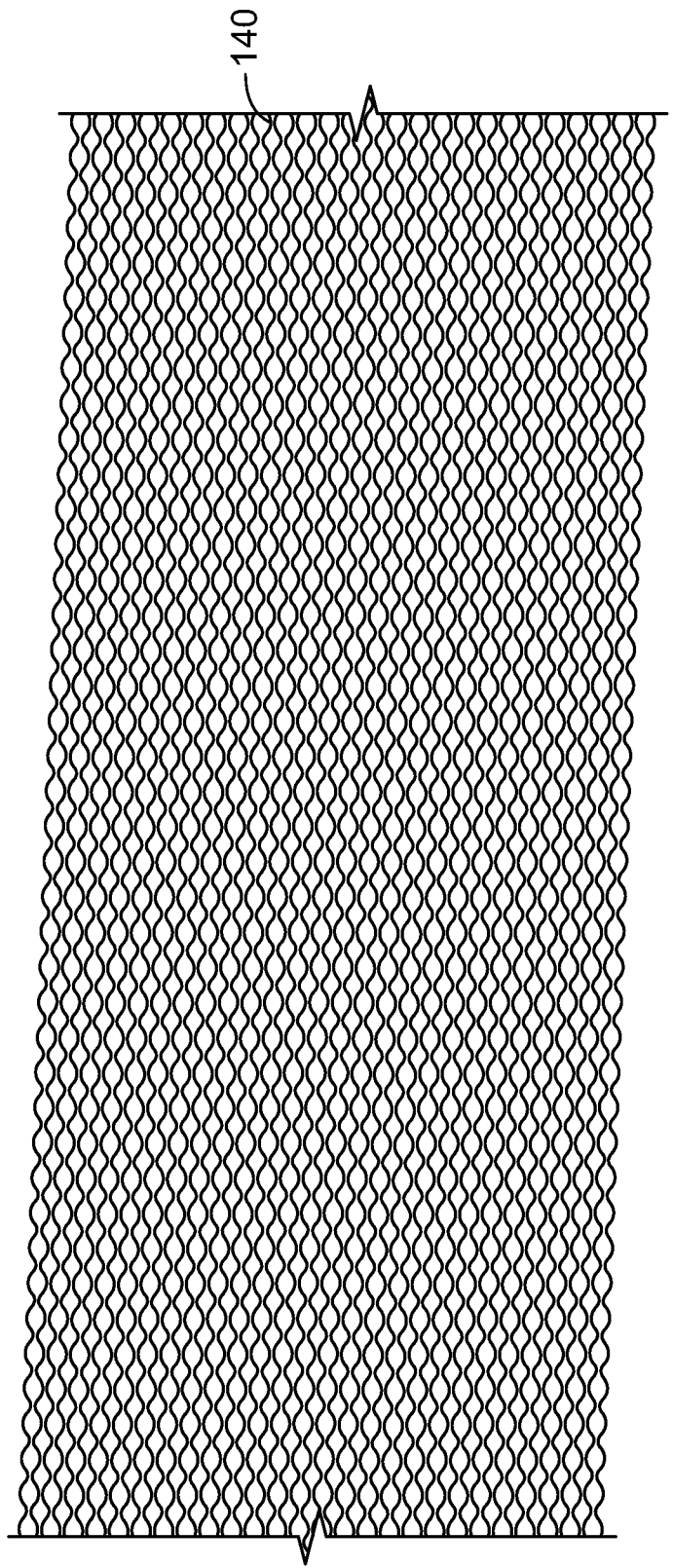
FIG. 3 depicts another illustrative plan view of the top surface after the deposition of the patterned adhesive layer 140, according to one or more embodiments provided herein.
Figure 4:
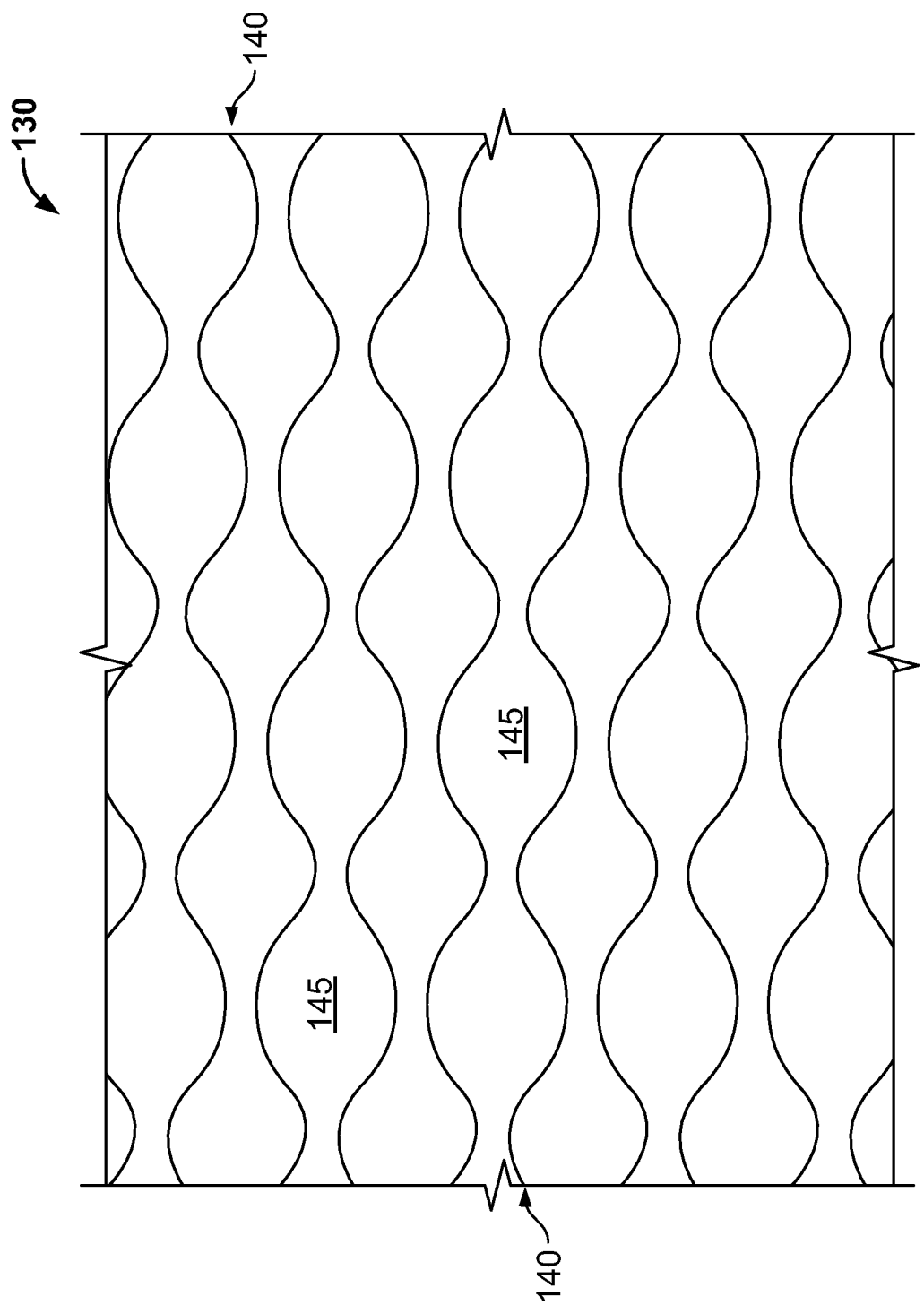
FIG. 4 depicts an enlarged schematic view showing the patterned adhesive layer 140 on top of the second coating layer 130 as depicted in FIG. 3.

Another illustrative arrangement of the patterned layer 140 is depicted in FIG. 3 and FIG. 4 depicts an enlarged schematic view of the patterned adhesive layer 140. As shown, each line can have one or more points of contact where portions of each line contact another to form a weave like pattern with closed pockets 145.

As mentioned, the third coating or adhesive layer 140 only partially covers the underlying second layer 130. The coverage of the third coating or adhesive layer 140 can range from about 5% to about 30%. The coverage can also range from a low of about 5%, 8%, or 12% to a high of about 15%, 17%, or 20%. In certain embodiments, the coverage will be about 10%, about 12%, about 15%, about 16%, about 17%, or about 19% of the surface area of the underlying second layer 130.

It is desirable that the pattern of the third layer 140 not make any closed pockets that entrap excess air between the two paper plies. As such, transverse parallel lines are more desirable than machine direction (MD) parallel lines. It was surprisingly discovered that a layered wrap without delamination could be commercially manufactured with low adhesion, i.e. low peel strength, between the plies. The transverse parallel adhesive pattern 140 allows air to move in or out of the sides of the web that provides a good product even with the low adhesion levels between the paper plies. The low adhesion levels also allow the product to be easily composted because the low adhesion levels allow the plies of paper to be more easily separated at commercial composting facilities.

The third coating or adhesive layer 140 can be or can include the same material or materials as the first coating 120 and/or the second coating 130. The dry basis weight of the third coating layer 140 can range from about 0.020 lbs/ream to about 3 lbs/ream. For example, the dry basis weight of the third coating layer 140 can range for a low of about 0.020, about 0.025, or about 0.035 lbs/ream to a high of about 0.075, about 1.0, or about 2.0 lbs/ream. The dry basis weight of the third coating layer 140 can also be about 0.020 lbs/ream to about 2.0 lbs/ream, or about 0.030 lbs/ream to about 1.8 lbs/ream, or about 0.05 lbs/ream to about 1.5 lbs/ream. The dry basis weight of the third coating layer 140 can also be about 0.025 lbs/ream, or about 0.030 lbs/ream, or about 0.050 lbs/ream, or about 0.075 lbs/ream, or about 0.10 lbs/ream, or about 0.50 lbs/ream, or about 0.75 lbs/ream, or about 1.00 lbs/ream, or about 1.25 lbs/ream, or about 1.50 lbs/ream.

The third coating or adhesive layer 140 can include one or more tackifiers. The tackifiers are preferable bio-based and/or biodegradable. The amount of the tackifier, if present, can range from a low of about 1 wt %, about 3 wt %, or about 5 wt % to a high of about 10 wt %, about 12 wt %, or about 15 wt %, based on the total weight of the coating 140. A suitable tackifier can provide a peel strength between the plies 110, 150 of less than about 340 g/2.54 cm, less than about 280 g/2.54 cm, or less than about 220 g/2.54 cm at a temperature of about 23° C. The peel strength can range from a low of about 100 g/2.54 cm, about 150 g/2.54 cm, about 200 g/2.54 cm, about 215 g/2.54 cm, or about 235 g/2.54 cm to a high of about 255 g/2.54 cm, about 270 g/2.54 cm, or about 285 g/2.54 cm at a temperature of about 23° C.

For any of the coating layers 120, 130, 140, suitable bio-degradable and/or one or more compostable materials can be or can include, for example, cellulose, starch (e.g. grain starch, root starch, vegetable starch), plant fiber, polyvinyl alcohol (PVOH), ethylene vinyl alcohol (EVOH), polylactic acid (PLA), polyamide-epichlorohydrin (PAE), poly(beta-amino) esters (PBAE), polycaprolactone (PCL), polybutylene succinate (PBS), polyhydroxyalkanoates (PHA), polyvinyl butyral (PBV), polybutyrate adipate terephthalate (PBAT), or similar compositions. The bio-degradable and/or compostable materials can be used individually, or in any combination. Each coating 120, 130, 140 can independently include less than 5.0 wt %, less than 4.0 wt %, less than 3.0 wt %, less than 3.0 wt %, or less than 1.0 wt % of polyethylene, polypropylene, polyethylene terephthalate, nylon 6,6, polyvinylidene chloride, or any combination thereof. Each coating 120, 130, 140 can also include one or more organic or inorganic fillers, such as calcium carbonate, magnesium carbonate, silica, calcium oxide, alumina, titanium dioxide, any other filler, or any mixture thereof. It is preferable that each coating 120, 130, 140 is independently made of at least 85 wt %, at least 90 wt %, at least 93 wt %, at least 96 wt %, at least 98 wt %, at least 99 wt %, or about 100 wt % of one or more bio-degradable and/or compostable materials. It is also preferable that none of the first, second and third coating layers 120, 130, 140 contain a thermoplastic or polyolefin.

Any of the coating layers 120, 130, 140 and any of the base sheets 110, 150 can further include one or more additives, including but not limited to those described above that do not affect the compostable nature of the overall wrap 100. For instance, any one or more of the coating layers or substrates described above or elsewhere herein can include one or more colorants to provide color and graphics to the individual layer(s) or substrate(s). Any suitable colorant can be used, including any one or more pigments, inks, paints, dyes, and combinations thereof. Suitable colorants that affect or modify opacity and brightness can also be used. If any one or more additives are present in an individual layer or substrate, each layer or substrate could include less than 5.0 wt %, less than 4.0 wt %, less than 3.0 wt %, less than 3.0 wt %, or less than 1.0 wt % of such additive(s).

Examples

The foregoing discussion can be further described with reference to the following non-limiting examples. Although the examples are directed to specific embodiments, they are not to be viewed as limiting the invention in any specific respect. All parts, proportions, and percentages are by weight unless otherwise indicated.

Six (6) compostable wraps were tested for water and oil barrier competencies for use as food wraps. In each sample, two plies of 12.5 #machine glazed ("MG") Kraft papers were laminated together with three layers deposited between the plies. In samples 1A, 1B, 3A, 3B, the paper plies were bleached and in Samples 2A, 2B the paper plies were natural.

Samples 1A, 1B, 2A, 2B had the following layer configuration: 12.5 #MG rough side out ("RSO")/0.083 #Patterned Third Layer/0.075 #Second Coating Flood/0.5 #First Coating Flood/12.5 #MG RSO.

Samples 3A, 3B were printed on the flood coated side of the wrap, and had the following layer configuration: Print/12.5 #MG RSO/0.5 #First Coating Flood/0.075 #Second Coating Flood/0.083 #Patterned third layer/12.5 #MG RSO In the paper making process, prior to lamination, one ply was treated with AKD surface sizing and size-press coated with plate like clay particles to provide a good water and oil penetration barrier. The AKD sized base paper showed excellent food release properties, so the food contact side was not coated by choice, although it could be coated as well.

The plies of paper were either a Bleached MG Kraft base sheet that was obtained from Ahlstrom-Munksjo, Kaukauna, Wis., Grade: 230250, description: 12.5 84611 WH MG ParaFree WS Servera; or a Natural MG Kraft base sheet from Ahlstrom-Munksjo, Kaukauna, Wis., Grade: 230240, description: 12.5 53611 NAT MG ParaFree WS Servera. The tables below identify the paper sheets used in each sample.

In every sample, the first layer was a water barrier Layer (0.5 #Compostable Coating for Water Resistance, Grade HY8000, obtained from Michelman Inc.); the second layer was an oil barrier layer (0.075 #of the Compostable Cold Seal Laminate Adhesive, Grade MC2000, obtained from Michelman Inc.); and the third layer was an adhesive pattern layer (0.083 #of the Compostable Cold Seal Laminate Adhesive, Grade MC2000, obtained from Michelman Inc.).

Each sample was laminated using the layered configurations stated above. FIGS. 3 and 4 show the adhesive pattern. The machine direction (MD) was the vertical dimension in FIG. 3 (the narrower side). The pattern was skewed relative to the Machine Direction to reduce plate bouncing and was designed to allow entrapped air to squeeze out the edges of the web during highspeed laminating and printing.

Table 1 reports the heat retention, measured in minutes, for a 0.25 lbs (quarter pound) hamburger patty to cool from 180° F. to 110° F. when wrapped within each sample. Table 2 reports the water vapor (i.e. moisture) loss, measured in grams, after 20 minutes for each patty as it cools from 180° F. to 110° F. when wrapped within each sample. Table 3 provides a summary of certain physical properties of each sample, including details on the TMI Ply Bond (grams per 3 inches) peel test. Tables 1 and 2 further provide comparison data of heat retention and moisture loss for two commercially available wraps, Dixie Quilt-Rap® (2 ply poly lamination) and Dixie Valu-Rap® (1 Ply wax coated), as well as if no wrap were used.

TABLE 1

Heat Retention Test Results.

| Sample ID | Description of Base Sheets | BW Lbs/ 3,000 ft² | Heat Retention, Minutes Average$_{n=5}$ | Std Dev |
|---|---|---|---|---|
| 1A | Unprinted Bleached | 25.7 | 49.81 | 2.9 |
| 1B | Unprinted Bleached | 25.7 | 52.44 | 1.75 |
| 2A | Unprinted Natural | 25.7 | 48.1 | 2.25 |
| 2B | Unprinted Natural | 25.7 | 49.66 | 1.5 |
| 3A | Printed Bleached | 25.7 | 49.16 | 2.79 |
| 3B | Printed Bleached | 25.7 | 47.81 | 1.73 |
| | Combined Trial Average = | | 49.50 | 2.54 |
| | Comparative Samples | | | |
| Dixie Quilt-Rap ® 2 Ply Poly Lamination | | 26.25 | 59.51 | 3.07 |
| Dixie Valu-Rap ® 1 Ply Wax Coated | | 20.5 | 43.66 | 2.88 |
| No Wrap | | 0 | 39.1 | 1.72 |
| No Wrap and No Top Bun | | 0 | 26.19 | 1.64 |

TABLE 2

Moisture Loss Test Results.

| Sample ID | Description of Base Sheets | BW Lbs/ 3,000 ft² | Water Loss, Grams Average$_{n=5}$ | Std Dev |
|---|---|---|---|---|
| 1A | Unprinted Bleached | 25.7 | 1.36 | 0.112 |
| 1B | Unprinted Bleached | 25.7 | 1.43 | 0.09 |
| 2A | Unprinted Natural | 25.7 | 1.31 | 0.062 |
| 2B | Unprinted Natural | 25.7 | 1.28 | 0.114 |
| 3A | Printed Bleached | 25.7 | 1.23 | 0.099 |
| 3B | Printed Bleached | 25.7 | 1.25 | 0.041 |
| | Combined Trial Average = | | 1.31 | 0.106 |
| | Comparative Samples | | | |
| Dixie Quilt-Rap ® 2 Ply Poly Lamination | | 26.25 | 0.0900 | 0.0181 |
| Dixie Valu-Rap ® 1 Ply Wax Coated | | 20.5 | 1.15 | 0.1016 |
| No Wrap | | 0 | 2.36 | 0.0950 |
| No Wrap and No Top Bun | | 0 | 3.28 | 0.1160 |

TABLE 3

Physical Properties Testing Data.

| Sample ID | Description | BW Lbs/3,000 ft² | Caliper mils | COF - Static Out/In | COF - Kinetic Out/In | TMI Ply Bond g/3 inch |
|---|---|---|---|---|---|---|
| 1A | Unprinted Bleached | 25.76 | 2.484 | 0.314 | 0.224 | 10.350 |
| 1B | Unprinted Bleached | 25.82 | 2.434 | 0.326 | 0.23 | 10.300 |
| 2A | Unprinted Natural | 26.01 | 2.654 | 0.262 | 0.191 | 12.983 |
| 2B | Unprinted Natural | 26.09 | 2.446 | 0.261 | 0.187 | 12.317 |
| 3A | Printed Bleached | 25.91 | 2.404 | 0.305 | 0.215 | 11.333 |
| 3B | Printed Bleached | 25.96 | 2.528 | 0.301 | 0.212 | 9.533 |
| | Combined Trial Average | 25.93 | 2.49 | 0.29 | 0.21 | 11.14 |

Surprisingly and unexpectedly, the two flood coatings in between the two plies of paper provided significantly improved lay-flat performance. In the past, when water-based polymer coatings were dried on one side of a light weight paper, they would curl the paper in the cross-direction (CD) toward the coated side of the sheet. On the contrary, the inventive samples provided herein, where the outer ply laid on top of the flood coatings, it was observed that the paper resisted the curl force and gave a more desirable lay-flat product. It is believed that the weight of the second ply held the underlying layers in place, thereby preventing curl. A flat food wrapper is critical for efficient sheeting and packaging quality as well as handling of the wrapper during food preparation.

Furthermore, the product printed and sheeted well with no waste or runnability issues. All the samples ran without any delamination at operating speed. A blend of the coating and adhesive materials did not improve ply bond because it was discovered that the two materials were incompatible in solution.

It was surprisingly discovered that compostable wraps made according to the embodiments described herein, exhibited very good barrier and heat retention performance. The measured heat retention is superior to Valu-Rap®, a wet wax wrap, and approaches the performance of Quilt-Rap®. It was also surprisingly discovered that Samples 1-3 all had very low adhesion between plies, averaging 11 grams/3 inches, yet no delamination issues were encountered during high speed laminating, printing, and sheeting. Such low bond levels can also provide an advantage in ASTM D6868 composability testing where disintegration is needed in 84 days. If the plies can separate easier under the mixing during compost testing, then the time needed to disintegrate the product could be less.

It was further discovered that laminating the rough side out on both plies increased the COF values so that sheeting in register was not an issue. Samples made with laminating one ply MG side out could not be sheeted in register as well because the COF was below 0.18. By laminating the rough side out on both plies of the MG paper, the COF was increased from below 0.18 to above 0.20, and print registration control was significantly improved.

Additional embodiments provided herein include any one or more of the following numbered paragraphs 1 to 24.

1. A compostable laminate for food wrap, comprising: a first layer of paper material; a second layer of paper material; a first flood coating having water barrier properties that is disposed on the first layer of paper material; a second flood coating having oil barrier properties that is disposed on the first flood coating, the second flood coating also having water barrier properties; and a third coating that only partially covers the second flood coating, wherein the second layer of paper material is disposed on the third coating and wherein none of the first, second and third coatings comprise a thermoplastic or polyolefin.

2. A compostable laminate for food wrap, comprising: a first layer of paper material; a second layer of paper material; a first flood coating having water barrier properties that is disposed on the first layer of paper material; a second flood coating having oil barrier properties that is disposed on the first flood coating, the second flood coating also having water barrier properties; and a third coating that only partially covers the second flood coating, wherein the third coating is patterned to form a plurality of air pockets between the second flood coating and the second layer of paper material when the second layer of paper material is disposed directly on the third coating and wherein none of the first, second and third coatings comprise a thermoplastic or polyolefin.

3. A compostable laminate for food wrap, comprising: a first layer of paper material; a second layer of paper material; a first flood coating having oil barrier properties and water barrier properties that is disposed on the first layer of paper material; a second flood coating having water barrier properties that is disposed on the first flood coating; and a third coating that only partially covers the second flood coating, wherein the second layer of paper material is disposed on the third coating and wherein none of the first, second and third coatings comprise a thermoplastic or polyolefin.

4. The laminate of any preceding paragraph 1 to 3, wherein the second flood coating material and the third coating material are the same.

5. The laminate of any preceding paragraph 1 to 4, wherein the second flood coating is a tie-layer that adheres to the first coating and the third coating.

6. The laminate of any preceding paragraph 1 to 5, wherein the first flood coating material and the third coating material are the same.

7. The laminate of any preceding paragraph 1 to 6, wherein the first flood coating is a tie-layer that adheres to the first layer of paper material and the second coating.

8. The laminate of any preceding paragraph 1 to 7, wherein the third coating is disposed as a plurality of individual wavy lines of adhesive material.

9. The laminate of any preceding paragraph 8, wherein no part of the wavy lines contact one another.

10. The laminate of any preceding paragraph 8 to 9, wherein the wavy lines are continuous in the transverse direction of the laminate and spaced apart from each other in the machine direction.

11. The laminate of any preceding paragraph 1 to 10, wherein the third layer covers about 10% to about 20% of the total surface area of the second flood coating.

12. The laminate of any preceding paragraph 1 to 11, wherein at least one side of the first and the second layers of paper material is size-press coated with a liquid water barrier size-press coating.

13. The laminate of paragraph 12, wherein the liquid water barrier size-press coating comprises AKD and starch.

14. The laminate of paragraph 12, wherein the liquid water barrier size-press coating further comprises clay particles.

15. The laminate of any preceding paragraph 1 to 14, wherein the first flood coating has oil barrier properties.

16. The laminate of any preceding paragraph 1 to 15, wherein one side of the first layer of paper material or one side of the second layer of paper material is machine glossed.

17. The laminate of paragraph 16, wherein the machine glossed sides of the first layer of paper material and the second layer of paper material provide the inner layers of the wrap.

18. The laminate of paragraph 16, wherein one of the machine glossed sides of the first layer or the second layer of paper material is printed.

19. The laminate of any preceding paragraph 1 to 18, wherein either the first layer or the second layer of paper material is printed.

20. The laminate of any preceding paragraph 1 to 19, wherein the basis weight of the first and second layers of paper material is about 9 lbs/ream to about 25 lbs/ream.

21. The laminate of any preceding paragraph 1 to 20, wherein the basis weight of the first and second layers of paper material are not the same.

22. The laminate of any preceding paragraph 1 to 21, wherein the basis weight of the first flood coating is 0.025 lbs/ream to about 2 lbs/ream.

23. The laminate of any preceding paragraph 1 to 22, wherein the basis weight of the second flood coating is 0.025 lbs/ream to about 1.5 lbs/ream.

24. The laminate of any preceding paragraph 1 to 23, wherein the basis weight of the third patterned coating is 0.025 lbs/ream to about 1.5 lbs/ream.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art. The term "about" includes the inherent and expected tolerances and/or slight variations that would be considered by a person of ordinary skill in the art to be within the bounds of the indicated value.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A compostable laminate for food wrap, comprising:
a first layer of paper material;
a second layer of paper material;
a first flood coating having water barrier properties that is disposed on the first layer of paper material;
a second flood coating having oil barrier properties that is disposed on the first flood coating, the second flood coating also having water barrier properties; and
a third coating that only partially covers the second flood coating, wherein the second layer of paper material is disposed on the third coating and wherein none of the first, second and third coatings comprise a thermoplastic or polyolefin.

2. The laminate of claim 1, wherein the second flood coating material and the third coating material are the same.

3. The laminate of claim 1, wherein the second flood coating is a tie-layer that adheres to the first coating and the third coating.

4. The laminate of claim 1, wherein the first flood coating material and the third coating material are the same.

5. The laminate of claim 1, wherein the first flood coating is a tie-layer that adheres to the first layer of paper material and the second coating.

6. The laminate of claim 1, wherein the third coating is disposed as a plurality of individual wavy lines of adhesive material.

7. The laminate of claim 6, wherein no part of the wavy lines contact one another.

8. The laminate of claim 6, wherein the wavy lines are continuous in the transverse direction of the laminate and spaced apart from each other in the machine direction.

9. The laminate of claim 1, wherein the third layer covers about 10% to about 20% of the total surface area of the second flood coating.

10. The laminate of claim 1, wherein at least one side of the first and the second layers of paper material is size-press coated with a liquid water barrier size-press coating.

11. The laminate of claim 10, wherein the liquid water barrier size-press coating comprises AKD and starch.

12. The laminate of claim 10, wherein the liquid water barrier size-press coating comprises clay particles.

13. The laminate of claim 1, wherein one side of the first layer of paper material or one side of the second layer of paper material is machine glossed.

14. The laminate of claim 13, wherein the machine glossed sides of the first layer of paper material and the second layer of paper material provide the inner layers of the wrap.

15. The laminate of claim 13, wherein one of the machine glossed sides of the first layer or the second layer of paper material is printed.

16. The laminate of claim 1, wherein either the first layer or the second layer of paper material is printed.

17. The laminate of claim 1, wherein the basis weight of the first and second layers of paper material is about 9 lbs/ream to about 25 lbs/ream.

18. The laminate of claim 1, wherein the basis weight of the first flood coating is 0.025 lbs/ream to about 2 lbs/ream; the basis weight of the second flood coating is 0.025 lbs/ream to about 1.5 lbs/ream; and the basis weight of the third patterned coating is 0.025 lbs/ream to about 1.5 lbs/ream.

19. A compostable laminate for food wrap, comprising:
a first layer of paper material;
a second layer of paper material;
a first flood coating having water barrier properties that is disposed on the first layer of paper material;
a second flood coating having oil barrier properties that is disposed on the first flood coating, the second flood coating also having water barrier properties; and
a third coating that only partially covers the second flood coating, wherein the third coating is patterned to form a plurality of air pockets between the second flood coating and the second layer of paper material when the second layer of paper material is disposed directly on the third coating and wherein none of the first, second and third coatings comprise a thermoplastic or polyolefin.

20. The laminate of claim 19, wherein the first flood coating is a tie-layer that adheres to the first layer of paper material and the second coating.

21. The laminate of claim 19, wherein the plurality of air pockets is defined by a plurality of individual wavy lines of adhesive material that are continuous in the transverse direction of the laminate and spaced apart from each other in the machine direction.

22. The laminate of claim 19, wherein the third layer covers about 10% to about 20% of the total surface area of the second flood coating.

23. A compostable laminate for food wrap, comprising:
a first layer of paper material;
a second layer of paper material;
a first flood coating having oil barrier properties and water barrier properties that is disposed on the first layer of paper material;
a second flood coating having water barrier properties that is disposed on the first flood coating; and
a third coating that only partially covers the second flood coating, wherein the second layer of paper material is disposed on the third coating and wherein none of the first, second and third coatings comprise a thermoplastic or polyolefin.

24. The laminate of claim 23, wherein the second flood coating material and the third coating material are the same.

25. The laminate of claim 23, wherein the third coating is disposed as a plurality of individual wavy lines of adhesive material and covers about 10% to about 20% of the total surface area of the second flood coating.

* * * * *